United States Patent [19]

Malafouris

[11] 4,158,992
[45] Jun. 26, 1979

[54] COMBINATION HIBACHI-TYPE GRILL AND ROTISSERIE

[76] Inventor: Dannie O. Malafouris, 7945 NE. Alberta St., Portland, Oreg. 97213

[21] Appl. No.: 807,380

[22] Filed: Jun. 17, 1977

[51] Int. Cl.² ........................................... A47J 37/04
[52] U.S. Cl. .............................. 99/421 HV; 99/339; 126/9 R
[58] Field of Search ............... 99/339, 340, 421 R, 99/421 P, 421 H, 421 HV; 126/9 R, 9 B, 2, 3, 25 R, 25 A, 25 B, 25 C, 372; D7/107, 108, 109, 110

[56] References Cited

U.S. PATENT DOCUMENTS

| | | | |
|---|---|---|---|
| 1,600,776 | 9/1926 | Peron | 99/421 H X |
| 2,552,861 | 5/1951 | Overman | 126/9 R X |
| 3,068,852 | 12/1962 | Purtzer | 99/421 H |
| 3,182,585 | 5/1965 | Rensch et al. | 126/25 A X |
| 3,298,301 | 1/1967 | Lowndes | 99/421 HV X |
| 3,356,012 | 11/1967 | Rosen | 99/421 HV X |
| 3,358,585 | 12/1967 | Scherer | 99/421 HV X |
| 3,359,887 | 12/1967 | Cleveland | 99/421 HV |
| 3,717,137 | 2/1973 | Moline et al. | 126/25 B |
| 3,742,839 | 7/1973 | Maley | 99/421 HV |
| 3,943,837 | 5/1976 | Trkla | 99/421 H X |

FOREIGN PATENT DOCUMENTS 426139  6/1911  France ................. 99/421 HV

Primary Examiner—William F. O'Dea
Assistant Examiner—Harold Joyce
Attorney, Agent, or Firm—Eugene D. Farley

[57] ABSTRACT

A combination hibachi-type grill and rotisserie comprises at least one fuel tray mounted on a base. Securing means demountably secures a pair of brackets to opposite sides of the tray in vertical arrangement. Mounting means on the brackets rotatably receives a spit longitudinally of the tray. Drive means coupled to the spit drives the same at a predetermined rotational speed.

2 Claims, 7 Drawing Figures

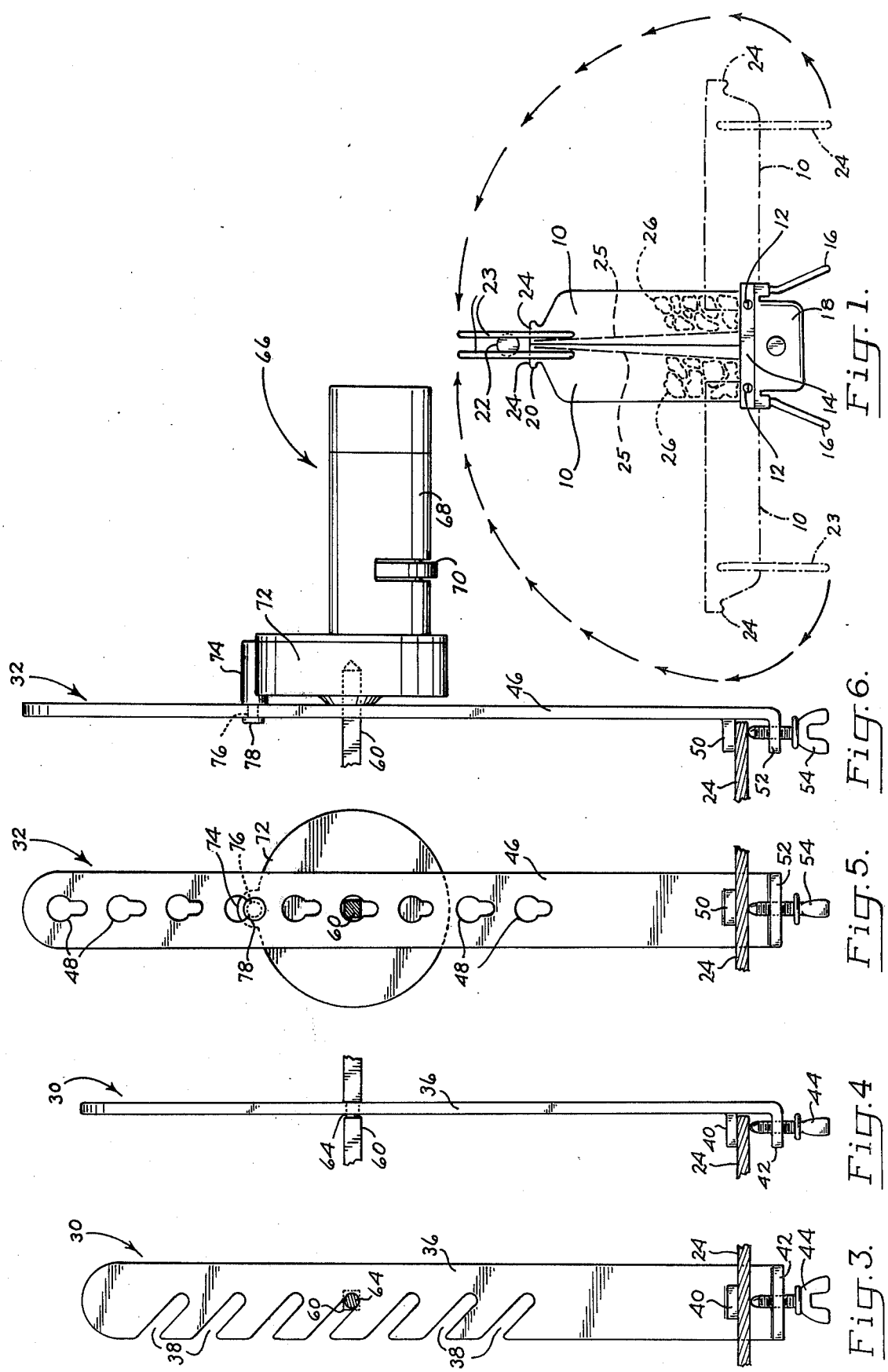

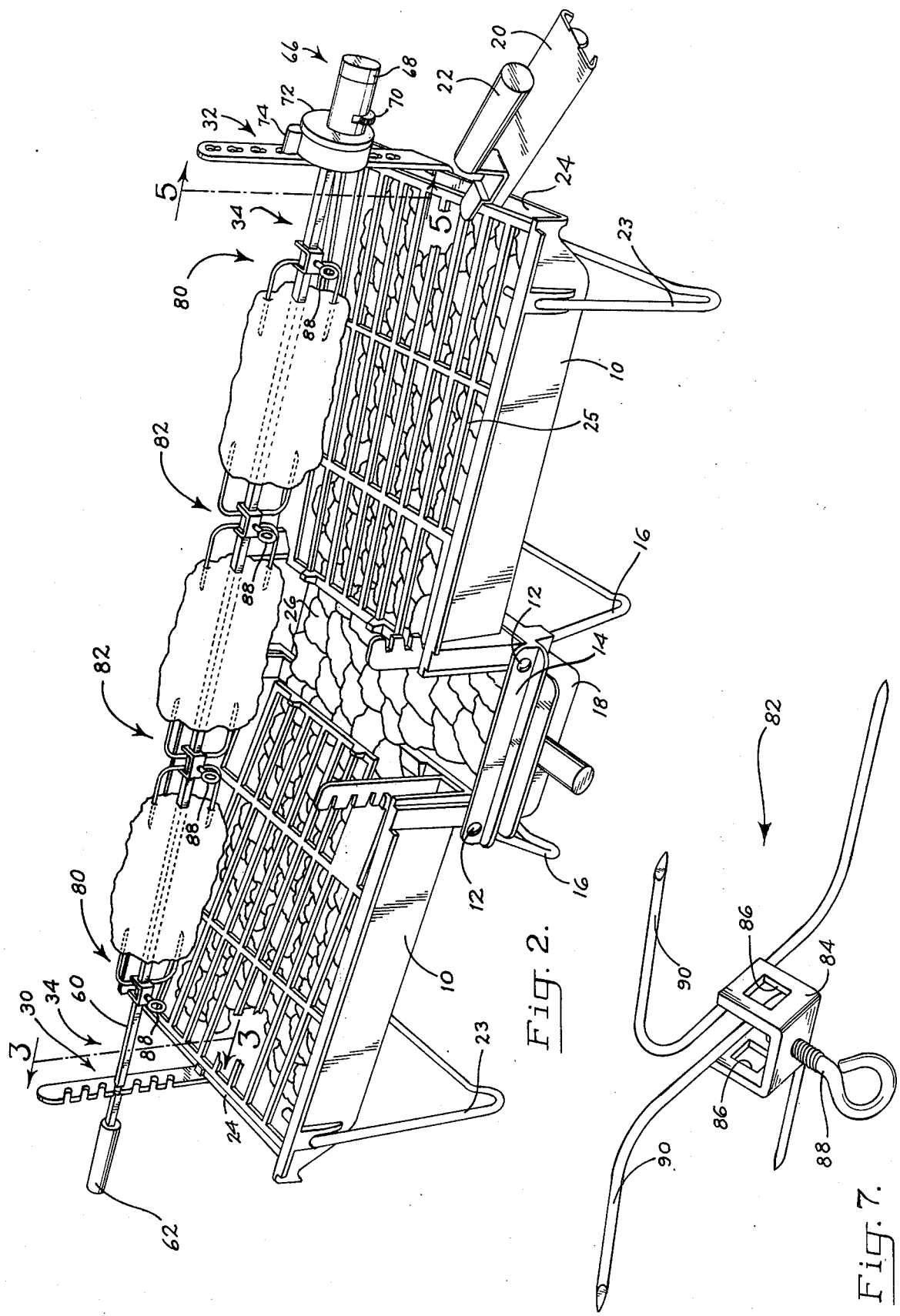

COMBINATION HIBACHI-TYPE GRILL AND ROTISSERIE

BACKGROUND AND GENERAL STATEMENT OF THE INVENTION

This invention pertains to hibachi-type grills. It pertains particularly to an hibachi-type grill provided with a demountable rotisserie.

The invention described herein relates particularly to foldable hibachi-type grills of the class disclosed and claimed in the copending applications of Charles R. White, Ser. No. 630,611, filed Nov. 10, 1975, now U.S. Pat. No. 4,046,132; Dannie O. Malafouris, Ser. No. 743,848, filed Nov. 22nd, 1976; and Dannie O. Malafouris, Ser. No. 762,051, filed Jan. 24th, 1977. The invention is described and illustrated herein with particular reference to grills of this class, although it also is broadly applicable for use with non-folding classes of hibachi-type grills.

Grills of the foldable class referred to above are widely used throughout the world with great enjoyment and success. However, their application is limited to strictly grill-type applications. The satisfaction attending their use obviously could be greatly enhanced by the provision of an associated rotisserie assembly for use in roasting or barbecuing fowl, fish, and various cuts of meat.

It is the general purpose of the present invention to provide a combination hibachi-type grill and rotisserie adaptable to such a use, which employs the same heat source as is employed when the apparatus is used as a grill, but which may be mounted on and demounted from the grill when a roasting function is desired, the one function being capable of accomplishment without detracting from the efficiency with which the other function may be accomplished.

Still further objects of the present invention are the provision of a combination hibachi-type grill and rotisserie characterized by the following attributes and advantages:

It is readily portable from place to place and usable in various environments.

It can be used universally for grilling, roasting and/or barbecuing almost any kind of meat.

The grilling and barbecuing functions can be carried on simultaneously i.e. a grilling function of short duration may be carried on during a barbecuing operation of long duration.

It will accommodate a roast of almost any class and, in view of efficient utilization of the cooking area, of almost any household size.

It supplies uniform heat over the entire grilling and barbecuing area.

It accommodates a substantial charge of charcoal or other fuel for barbecues of long duration.

It is economical in its use of fuel.

It is provided with a built-in drip drawer for grease, thereby minimizing flareups of flame.

It can be recharged with fuel while cooking.

It is possible to locate the fuel selectively where needed.

It is provided with a reversible spit driven by a single flashlight battery.

It is easily possible to adjust the spit to accommodate cuts of meat of various sizes and shapes.

It may be converted from a grill to a rotisserie and back again rapidly, quickly and easily.

The foregoing and other objects of the invention are accomplished by the provision of the combination hibachi-type grill and rotisserie comprising a base and at least one dished fuel tray mounted on the base. A grill overlies the fuel tray. A pair of vertical brackets is secured demountably to opposite ends of the tray. A spit is rotatably received in the brackets. Drive means, preferably a battery powered electric motor, is mounted on one of the brackets adjacent to the spit. Coupling means releasably couples the spit to the motor.

Accordingly, the unit may be used as a grill, or in the alternative, by mounting the brackets, spit and motor on the fuel tray, as a rotisserie whenever this is desired.

DESCRIPTION OF A PREFERRED EMBODIMENT OF THE INVENTION

The manner in which the foregoing and other objects of the invention are accomplished will be apparent from the accompanying specification considered together with the drawings of a preferred embodiment of the invention. In the drawings:

FIG. 1 is a view in end elevation of a foldable portable hibachi-type grill of the class of which the present invention principally is concerned.

FIG. 2 is a top perspective view of the grill in its open, cooking position with the rotisserie assembly of the invention mounted thereon.

FIG. 3 is a fragmentary sectional view taken along line 3—3 of FIG. 2 and illustrating one of the spit-mounting brackets with which the grill is provided.

FIG. 4 is a fragmentary view in side elevation of the bracket of FIG. 3.

FIG. 5 is a fragmentary sectional view taken along line 5—5 of FIG. 2 and illustrating the other of the spit-supporting brackets.

FIG. 6 is a fragmentary view in side elevation of the bracket of FIG. 5 and

FIG. 7 is a perspective view of a meat-mounting fork assembly with which the spit is provided.

The portable, folding, hibachi-type grill illustrated in FIGS. 1 and 2 is particularly well suited for use with the herein-described rotisserie assembly. It is of the general class of hibachi grills set forth and described in the aforesaid patent application of White, Ser. No. 630,611, Malafouris 743,848 and Malafouris 762,051.

The component parts of the grill which are particularly important in connection with the present assembly are a pair of dished fuel trays 10 connected by means of pivot pins 12 with a base 14.

Base 14 mounts supporting legs 16 and a sliding ash or base tray 18.

The outer ends of fuel trays 10 mount a sliding damper 20 with associated handle 22.

At their upper ends trays 10 also mount a pair of pivotally mounted members 23 which serve as handles in their upright position and as legs or supports in their lowered position.

Still further, the trays are provided with lips 24.

A pair of cooking grates 25, which normally are perforated, overlie the fuel trays and move therewith. They are positioned a spaced distance from the bottom of the trays, thereby providing a space for charcoal briquettes 26 or other solid fuel. In the use of the grill, the solid fuel is charged to the trays in the horizontal, dashed line positions. The trays then are swung upwardly about pivot pins 12 to their vertical full line positions, a suitable draft is established by opening drawer 18 and damper 20 and, with the assistance of lighter fluid, paper or other starting materials, the briquettes are ignited.

After the fire is burning, the trays are pivoted downwardly to the cooking position of the grill.

The grill now is ready for attachment of the hereindescribed rotisserie assembly which, broadly considered, includes a first bracket or standard indicated generally at 30, a second bracket or standard indicated generally at 32, and a spit indicated generally at 34.

Bracket 30 attaches to the left side of the grill as viewed in FIG. 2. As shown particularly in FIGS. 3 and 4, it comprises a flat bar 36 provided with a plurality of vertically spaced, downwardly angled, round-bottomed slots or notches 38. The bar also has integral securing means for securing it demountably on lip 24 of the left hand tray 10.

As illustrated, the securing means comprises an inwardly directed bearing plate 40 spaced from an inwardly directed bottom flange 42. These members cooperate to receive lip 24 of tray 10 between them. The bracket then is secured to the lip in vertical position by means of a thumb screw 44 threaded into a central opening through flange 42.

Cooperating bracket or standard 32, FIGS. 5 and 6, comprises a flat bar 46 of slightly greater height than bar 36. It is provided with a plurality of vertically spaced apertures 48 the bottoms of which are substantially aligned with the bottoms of slots 38 in bar 36. As is apparent from FIG. 5, the apertures have upper portions of increased cross section and lower portions of restricted cross section, the purpose of which will appear hereinafter.

Near the bottom of bar 46 there is provided an inwardly extending bearing plate 50 which cooperates with an inwardly extending terminal flange 52 to provide a jaw which receives lip 24 of the right hand fuel tray 10. A thumb screw 54 is threaded into a threaded opening centrally of flange 52 and bears against the fuel tray lip for demountably securing the bracket to the fuel tray in an upright or substantially vertical position. Spit 34 comprises an elongated, pointed rod 60. This rod is made of fire-and corrosion-resistant metal and is angular in cross section; square in the illustrated embodiment.

At its left end, rod 60 mounts a handle 62 for easy manipulation. This may be made of wood, plastic, or other suitable material.

Intermediate its ends, but adjacent slotted bracket 30 rod 60 is provided with a segment 64 of reduced diameter, FIG. 4. This segment is circular in cross section and serves as a shaft about which the spit can be rotated.

Shaft segment 64 of rod 60 is dimensioned for insertion and bearing engagement with the rounded bottoms of slots 38 in bracket 30. It is of relatively short length to provide shoulders with the adjacent rod segments of square cross section. These shoulders are designed to bear against the side faces of bar 36 and in this manner position rod 60 in the longitudinal direction.

The right hand end of rod 60 is dimensioned to pass through the enlarged portion of any one of apertures 48 in bar 46, with ample clearance for rotation therein.

The length of rod 60 is such that its right hand terminal portion extends through one of apertures 48 and outwardly beyond the plane of the outer face of bar 46, as shown in FIG. 6. There it is coupled releasably to drive means for rotating the spit at a predetermined rotational speed.

A reversible electric motor assembly is preferred for this purpose. The assembly is indicated generally at 66. It comprises a battery case 68, an on-off switch 70, and an electric motor with suitable gear box 72. The drive shaft of the motor assembly is hollow and receives the pointed end of angular rod 60 for releasable driving engagement therewith, thereby coupling the motor assembly to the spit.

Support means are provided for demountably supporting the motor assembly on bracket 46 adjacent the end of the spit.

As illustrated in FIGS. 5 and 6, the support means comprises a pad 74 fastened to, or integral with, the case of motor gear box 72. The pad is located on the top of the gear box and mounts an outwardly extending pin 76 having an enlarged flat head or keeper 78.

Pin 76 is dimensioned for passage through the larger portions of apertures 48 and for reception in the smaller portions thereof. Enlarged head 78 of the pin is dimensioned to pass through the enlarged portions of the apertures 48 but not to pass through the portions thereof of restricted dimension. The distance between pin 76 and the motor assembly drive shaft is an even multiple of the distance between the apertures.

Thus the pin assembly serves as a hanger for supporting the motor assembly at the selected elevation on bracket 32. This arrangement makes it easily possible to adjust the position of the spit to the desired elevation. This is accomplished simply by inserting the pin hanger in the appropriate aperture 48 and inserting the ends of rod 60 in the appropriate ones of aligned slots 38 of bracket 30 and apertures 48 of bracket 32.

Spit 34 also provided with fork means for securing meat to the spit as it is roasted over the grills. The fork means and their manner of application are illustrated in FIGS. 2 and 7.

It is a particular feature of the invention that the hereindescribed arrangement of a grill and rotisserie enables cooking with maximum efficiency almost any of the commonly available cuts of meat, fish and fowl. The construction and arrangement of the fork means employed in conjunction with the spit facilitates the accomplishment of this objective.

As shown in FIG. 2, there are two classes of fork means employed; the terminal forks 80 and the intermediate forks 82. The construction of the intermediate forks 82 is illustrated particularly in FIG. 7.

Each such fork comprises a base 84 comprising a U-shaped member having opposite, squared openings 86. These are aligned and are designed to receive in sliding engagement rod 60 of the spit. They thus serve as slides by means of which the forks may be shifted to selected locations along the length of rod 60. In the selected locations, they are releasably secured by means of a screw 88 threaded into a central opening in the intermediate leg of the U-shaped slide and bearing against rod 60.

Base 84 mounts a pair of double fork tines 90. These are welded or otherwise fixed to the ends of the outside legs of the base and are directed in diametrically opposed directions substantially paralleling rod 60.

The terminal forks 80 are constructed similarly, with the exception that but a single double tine is mounted on base 84.

Accordingly, cuts of meat to be cooked can be mounted easily and securely simply by passing pointed rod 60 through the cuts while interposing the fork assemblies between the cuts. The fork assemblies then are positioned in such a manner as to secure the meat in the desired location relative to the grill and fixed in place by operation of screws 88.

OPERATION

The manner of operation of the hereindescribed combination folding hibachi-type grill and rotisserie is as follows:

First fuel trays 10 and, if desired, ash tray 18, are charged with charcoal. Lighter fluid is applied. The trays are swung to the upright position of FIG. 1. Damper 20 is opened, as is ash drawer 18 to provide a draft through the grill.

The lighter fluid is lighted either before or after swinging the trays into vertical position. The resulting stove effect creates a draft which quickly ignites the charcoal. The trays then are swung down to the dotted line position of FIG. 1, which is also the position of FIG. 2.

Brackets 30, 32 are fixed to the respective ends of the two fuel trays in substantial alignment with each other by operation of thumb screws 44. The meat is impaled on spit rod 60, interposing fork assemblies 80 and 82 between the meat pieces. The meat pieces then are shifted along the length of the rod until they are in the desired location.

The rod next is mounted at the desired elevation on brackets 30, 32. Motor assembly 66 is coupled to the end of the rod and hung by means of pin 76 on apertured bracket 32. Starting the motor initiates rotation of the spit, which is continued until the meat has been cooked.

After cooking has been completed, the above sequence is reversed to demount the rotisserie assembly from the grill. The grill with the charcoal still burning then may be moved from the dashed line position of FIG. 1 to the full line position thereof, ash drawer 18 closed, and damper 20 closed. Thereupon the burning coarcoal, being starved for air, soon will be extinguished. If desired, the extinguishing of the charcoal and transport of the unit from one place to another may be expedited by placing the entire folded grill into the air-tight pouch described in my U.S. Pat. application Ser. No. 762,051 aforesaid.

Having thus described my invention in preferred embodiments, I claim:

1. In combination with a portable, folding, hibachi-type grill comprising a base and a pair of dished fuel trays arranged end-to-end and hinged to the base for pivotal movement between a raised vertical storage and fuel-igniting position and a lowered horizontal cooking position, the trays having horizontal lips projecting longitudinally outward from their ends opposite their hinged ends, a demountable rotisserie assembly comprising:
    (a) a pair of elongated brackets each having an inwardly extending flange at one end, an inwardly extending bearing plate adjacent but spaced from said flange, and a clamp screw extending through a threaded opening in the flange for releasably clamping one of said horizontal lips between the bearing plate and clamp screw, whereby to secure the brackets in substantially vertical position on opposite longitudinal ends of the hinged trays,
    (b) a spit member,
    (c) mounting means rotatably mounting the spit member at a selected one of a plurality of elevations on the brackets longitudinally of the trays to cause the spit member to extend horizontally between said horizontal lips completely across said fuel trays and base, said mounting means including a first bracket containing a plurality of vertically spaced slots extending angularly downward from one side edge thereof, and a second bracket containing a plurality of vertically spaced apertures, the apertures being of key-hole shape with the narrow portion extending downward from the wide portion and the wide portion being aligned horizontally with the inner end of an associated slot contained in the first bracket, said spit member being rotatably supported at one end in one of said slots,
    (d) drive means for rotating the spit member at a predetermined rotational speed,
    (e) means mounting the drive means adjacent the spit member, said drive mounting means including a pin projecting from the drive means for reception in the narrow portion of a first one of said key-hole apertures, the pin having on its outer end an enlarged head which is smaller than the wide portion of the key-hole aperture and larger than the narrow portion of the key-hole aperture, and
    (f) coupling means coupling the drive means to the other end of said spit member, said coupling means including a non-circular opening contained in the drive means for registration with the wide portion of another one of said apertures for driving reception of an end of the spit.

2. Apparatus as defined in claim 1, wherein said spit means includes fork means for supporting food portions longitudinally of the spit member above said base and each of said fuel trays, respectively.

* * * * *